Feb. 22, 1949.
T. ROBINSON
2,462,554
APPARATUS FOR SONIC PULVERIZATION
AND DISPERSION OF MATERIALS
Filed Aug. 23, 1944
3 Sheets-Sheet 1
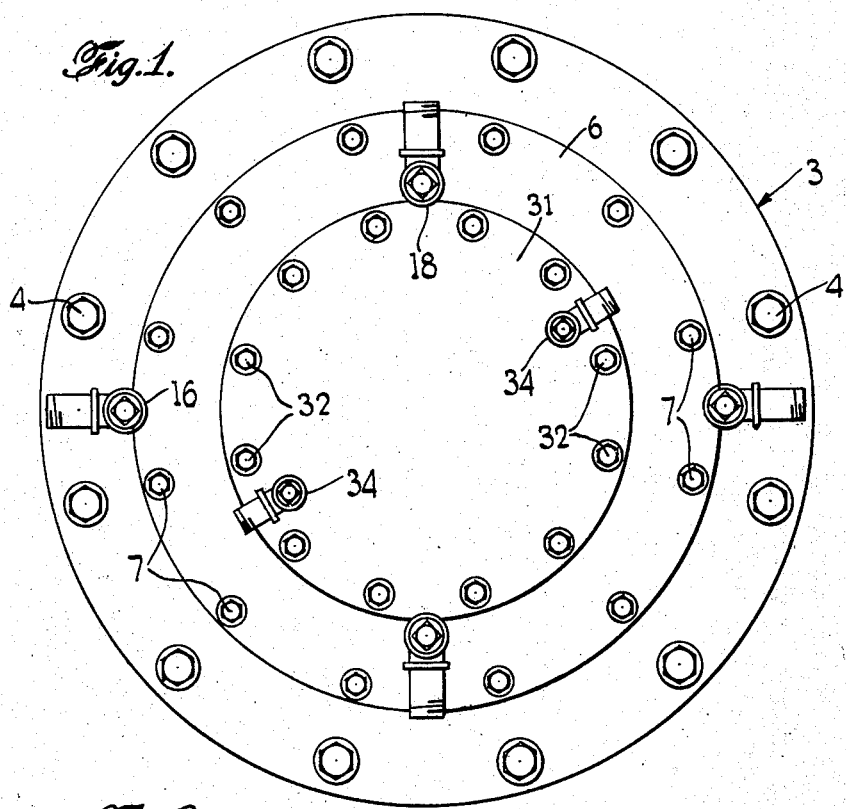
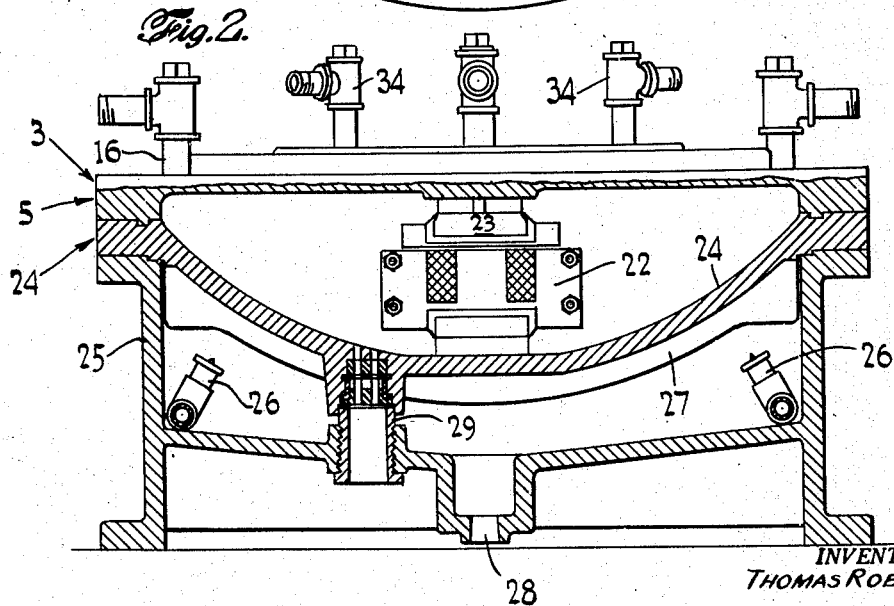
INVENTOR.
THOMAS ROBINSON
BY
Robert E. Burns
ATTORNEY.

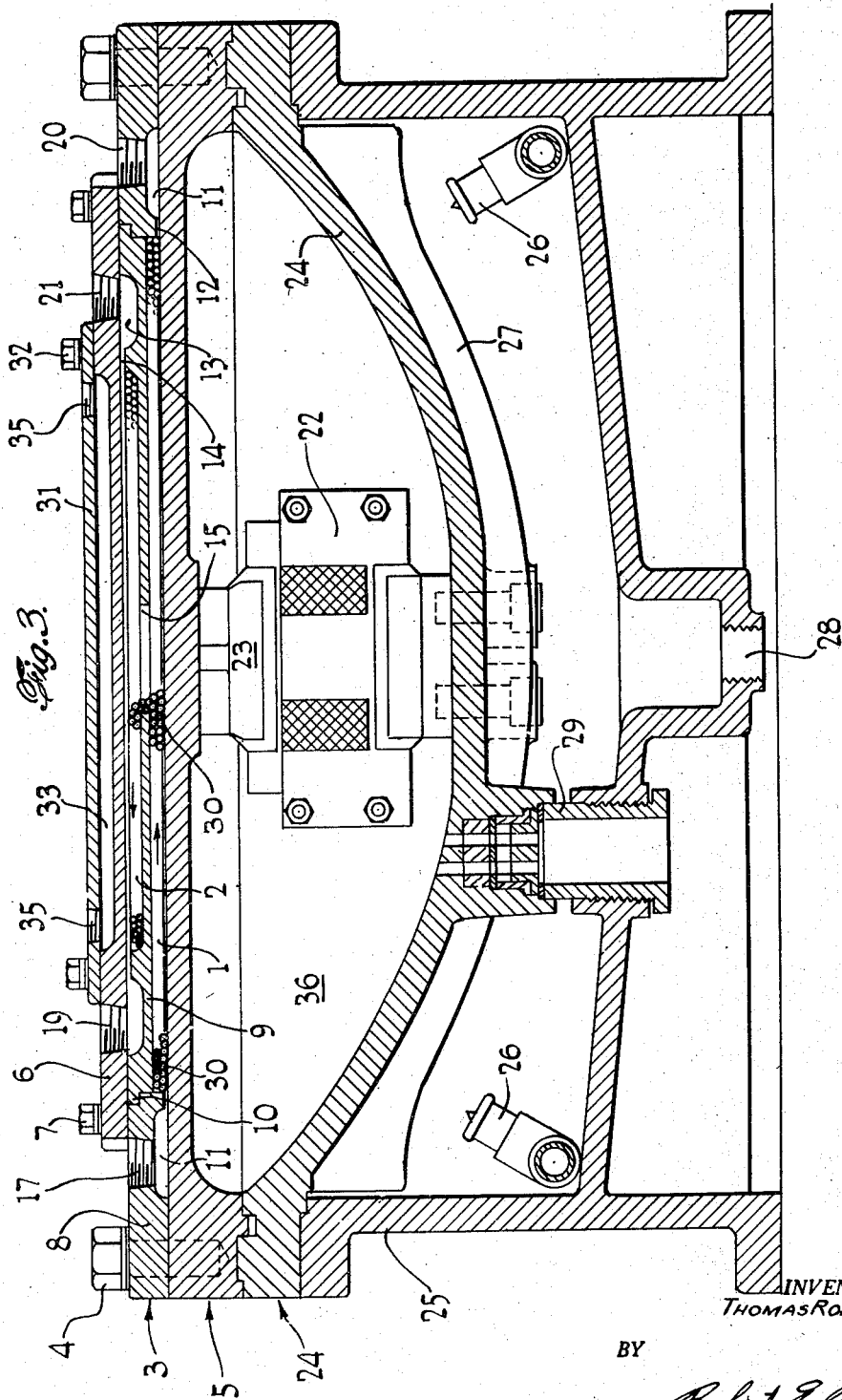

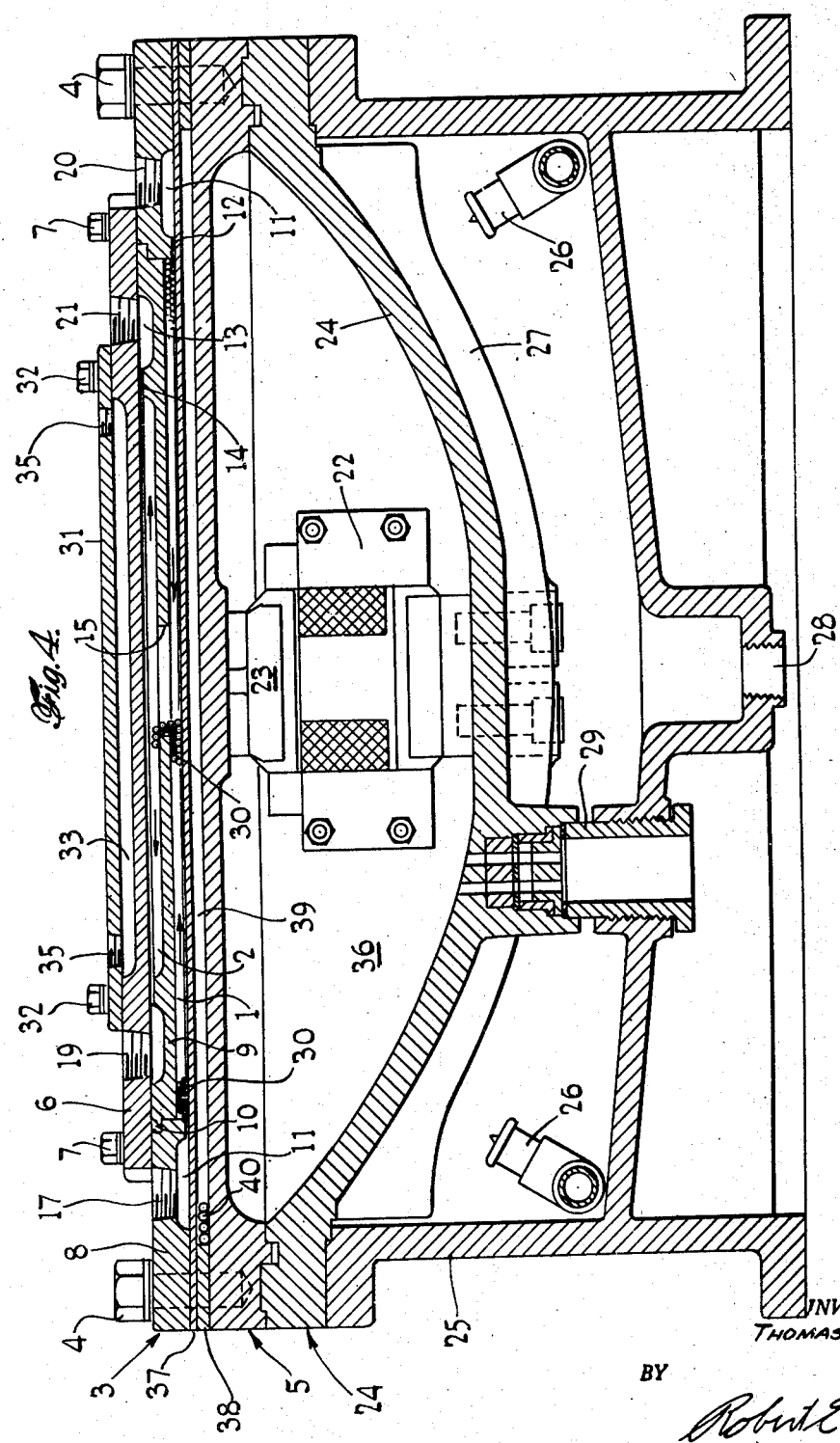

Patented Feb. 22, 1949

2,462,554

UNITED STATES PATENT OFFICE 2,462,554

APPARATUS FOR SONIC PULVERIZATION AND DISPERSION OF MATERIALS

Thomas Robinson, New York, N. Y., assignor to Lancaster Processes, Inc., New York, N. Y., a corporation of New York Application August 23, 1944, Serial No. 550,728

7 Claims. (Cl. 241—153)

1

The present invention relates to the preparation of emulsions and suspensions and finely pulverized material hereinafter referred to generically as dispersions. The term "dispersions" as herein used is understood to include any material or mixture in which particles of solid or liquid material are suspended permanently or temporarily in a fluid medium. In speaking of the preparation of such dispersions, the term "preparation" is used as including both the initial formation and any subsequent treatment for reducing the particle size or altering the properties of the dispersion.

In preparing dispersions it is highly desirable to reduce the particle size to extremely low values, for example to a fraction of a micron. The minute size of the particles not only contributes to the stability of the dispersion, but also affects in many instances the physical, chemical, pathological and other properties of the substance. Moreover, it is frequently desirable to pulverize solid materials to extremely small particle size, and this may advantageously be done by suspending the comminuted solid material in a fluid medium and subjecting the fluid suspension to treatment to reduce the size of the solid particles. It will be understood that the term "particle" is used in a generic sense to refer to particles of solid in a suspension, and also to globules or particles of liquid in an emulsion.

As the particle size becomes smaller, it is more and more difficult to obtain further reduction. It is still more difficult to achieve the minute particle size desired in a practical commercial process as distinguished from laboratory methods. In a commercial process it is necessary to consider not only the ultimate size of the particles produced, but also such factors as rate of production, uniformity of results, economy of operation, original cost and maintenance of the required apparatus and general practicability. The commercial preparation of dispersions of extremely small particle size thus presents a difficult problem that has not satisfactorily been solved by the methods and apparatus of the prior art.

It is an object of the present invention to provide improved apparatus for preparing dispersions characterized by a particle size of extremely low value and of remarkable uniformity. Another object of my invention is to increase the rate of production of dispersions while still achieving a particle size of an extremely low order, and thereby providing a method and apparatus that are commercially practical and economical. A

2 further object of my invention is to substantially increase the rate of production of each unit of the apparatus employed, and thereby decrease the total number of units needed.

Another object of the present invention is to provide improved apparatus for preparing dispersions by the application of sonic vibration and impact wherein the vibrational energy is utilized in an effective and efficient manner and dissipation of energy in the form of objectionable noise is substantially reduced.

The improved apparatus for preparing dispersions in accordance with the present invention is further characterized by simplicity of construction, ease of cleaning, economy of operation, and by low maintenance cost.

Other objects and advantages of my invention will be understood from the following description and appended claims, in conjunction with the accompanying drawings which show by way of example two forms of apparatus that may be used in carrying out my novel method.

In the drawings,

Fig. 1 is a plan of one form of apparatus in accordance with my invention.

Fig. 2 is a side elevation, partially in section, of the apparatus shown in Fig. 1.

Fig. 3 is an enlarged vertical cross section in which inlet and outlet openings of the several chambers of the apparatus are shown in a single plane for clarity of illustration.

Fig. 4 is a vertical cross section similar to Fig. 3, but showing a modification of the apparatus.

The present invention is applicable to fluent materials of all kinds, and is particularly advantageous where permanent emulsions of two or more immiscible liquids, or a permament suspension of a solid in a liquid, is desired. It is also applicable where it is desired to reduce the particle size of solid materials permanently or temporarily suspended in a fluid, or to pulverize or disintegrate particles of matter. For example, bacteria present in a liquid may be disintegrated and thereby killed by treatment in accordance with my invention. Effective and rapid pulverization of material to a particle size of the order of a fraction of a micron, can readily be achieved.

In carrying out my invention with the apparatus shown in the accompanying drawings, the fluent material to be treated is passed continuously through a series of superposed communicating treating chambers, while subjecting it to intense vibration and impact produced by vibration of the walls of the chambers. The material is thus treated by a continuous process, achieving smaller particle size, greater uniformity of result, and higher rate of production than are obtained by "batch" methods of treatment. In passing from one treating chamber to the succeeding chamber of the series, the direction of flow of the material is reversed. For example, if the material has been caused to flow radially inwardly in one chamber, it will flow radially outwardly in the succeeding chamber. This reversal of the direction of flow results in thorough commingling and mixing of all portions of the material being treated, and contributes to the uniformity of the results characterizing the method of the present invention. Moreover the flow of the material through an aperture in a vibrating wall in passing from one chamber to the next, subjects the material to the intensified action of the edges of the aperture concurrently with the turbulence and mixing resulting from the reversal in the direction of flow of the material.

In previous apparatus for treating materials by high frequency vibration, much of the vibrational energy produced by the apparatus has been dissipated in the form of sound. Not only is the resulting noise extremely objectionable, but the loss of energy is so great that efficiency and rate of production of the apparatus are severely limited. A feature of the present invention is that energy which has heretofore been dissipated, is effectively utilized in the treatment of the material. For example, in the apparatus shown in the drawings, vibrational energy applied to one of the walls of one of the treating chambers is transmitted to the opposite wall of such chamber, which also forms a wall of the adjacent treating chamber. The energy from a single vibrating wall driven by a suitable vibrator, is thus utilized to vibrate the walls of a plurality of communicating, superposed treating chambers through which the material is passed. Moreover, dissipation of the available energy in the surrounding atmosphere is avoided by evacuating a space at least partially surrounding the chamber in which the material is treated. The evacuated space prevents the travel of sound waves and hence retains the vibrational energy in the treating chamber where it can do useful work.

In the embodiment of the invention shown in the accompanying drawings, the treating chambers are substantially filled with a multiplicity of impact elements shown in the form of hard balls, such as those used in ball bearings. The impact elements also substantially fill the communicating passageway between successive chambers. The impact elements are caused to vibrate by the vibration of the walls of the treating chamber and subject the material in the chamber to rapidly recurring impact of the elements with one another, and with the walls of the chamber. The impact elements also assist in transmitting vibrational energy from one another of the walls of the series of chambers. As the elements are free to move within the limits of the treating chamber, the amplitude of vibrational movement of the balls may be greater than the amplitude of vibration of the driven wall by which the impact elements are vibrated. The present invention thus provides a convenient and effective method of increasing the amplitude of vibration of a vibrating system.

In Figs. 1 to 3 of the drawings, there is shown by way of example, one embodiment of apparatus for carrying out my invention. In this embodiment of the apparatus a plurality of treating chambers, 1 and 2 (Fig. 3) are provided by a series of superposed walls which are united with one another at their peripheries and have central portions that are spaced apart to form the treating chambers. A wall or diaphragm 3 constituting the upper wall of the lower treating chamber is connected by a plurality of bolts 4 with a wall or diaphragm 5 which forms the lower wall of the chamber 1. The wall 3, which forms the upper wall of the lower treating chamber, also forms the lower wall of the upper treating chamber 2. A wall or diaphragm 6 connected at its periphery to the wall 3 by a plurality of bolts 7 forms the upper wall of the treating chamber 2. For convenience of manufacture and subsequent cleaning and maintenance of the apparatus, the wall 3 is made in two pieces comprising an annular peripheral portion 8 and a central portion 9. The central portion 9 has an annular flange 10, which seats in a corresponding groove or recess provided in the peripheral portion 8. It will be seen that by removing the bolts 7, the wall 6 and the central portion 9 of the wall 3 can be lifted off, giving access to both of the treating chambers. It will be understood that in assembling the superposed walls forming the treating chambers, suitable spacers may be used at the periphery of the walls to secure the desired spacing, and that suitable gaskets may be employed to insure a fluid tight joint between successive walls.

The peripheral portion 8 of the wall 3 is shaped to provide an annular passage or manifold 11 communicating with the treating chamber 1 through a restricted opening 12. A similar passage or manifold 13 surrounds the treating chamber 2 and communicates therewith through a restricted opening 14. Moreover, the treating chambers 1 and 2 communicate with each other through a central opening 15 formed in the central portion 9 of the wall 3. The fluent material to be treated is passed through the treating chambers by means of suitable fluid connections with the annular manifolds or passageways 11 and 13. For example, a feed pipe 16 (Figs. 1 and 2) may be screwed into a threaded inlet opening 17 communicating with the manifold 11 while a discharge pipe 18 may be screwed into a threaded outlet 19 communicating with the annular manifold 13. Additional openings 20 and 21 communicating respectively with manifolds 11 and 13 may be provided as desired, either for convenience in forcing steam or other fluids through the apparatus to clean it, or for feeding material to or discharging it from the treating chambers, as desired. Using the opening 17 as an inlet and the opening 19 as an outlet, for the material to be treated, it will be seen that the material entering through the inlet 17 is distributed around the treating chamber 1 by the manifold 11 and hence flows radially inwardly to the central opening 15 in the wall 3. The material thereupon passes upwardly through this opening and reverses its direction of flow, flowing radially outwardly to the manifold 13, and hence around the manifold to the discharge opening 19. The material flowing inwardly from all parts of the circumference of the treating chamber 1, thus converges in the central opening or passageway 15. It thereupon flows outwardly to all parts of the circumference of the treating chamber 2 and after passing through the restricted opening 14 and around the manifold 13, again converges at the outlet 19. The change in the direction of flow and the repeated conversion and dispersion of the material resulting from this arrangement contributes to thorough and complete commingling and mixing of all portions of the material, so that the resulting product is uniform throughout. It will be understood that additional treating chambers may be provided as desired, successive chambers communicating with one another in such manner that the direction of flow of the material is changed each time it passes from one treating chamber to the next. It will further be understood that the direction of flow of the material through the apparatus may be reversed so that the material enters the upper chamber, for example, through the opening 19 and is discharged from the lower chamber, for example, through the opening 17. Moreover, while reference has been made to superposed walls and superposed treating chambers, the walls need not be horizontal as shown by way of example in the drawings.

During flow of the material through the treating chambers as described above, it is subjected to intense vibration and impact by vibration of the walls of the treating chambers. In the embodiment shown in Figs. 1 to 3 of the drawings, the lower wall of the diaphragm 5 is vibrated by means of an electro-magnet 22 acting on an armature 23 provided on the under side of the diaphragm 5. The electro-magnet 22 is mounted in a dish-shaped support 24 which also supports the diaphragm 5 at its periphery, and is in turn supported by a base 25. To regulate the temperature of the electro-magnet and associated parts, a heat regulating fluid is preferably directed against the under side of the magnet support 24, a plurality of nozzles 26 being shown for this purpose. The under side of the support 24 may be provided with a plurality of fins 27, which preferably extend radially of the support and facilitate heat transfer as well as rigidifying and strengthening the supporting member. The bottom of the base 25 is shown provided with a drain 28 for draining off the heat regulating fluid which may be either discharged as waste, or recirculated. A fitting 29 is also shown extending through the bottom of the base 25 and the support 24 to provide for electrical connections to the magnet 22.

By supplying alternating or pulsating current of the proper frequency to the electro-magnet 22, the diaphragm 5 is set in vibration. The frequency of vibration of the diaphragm 5 is preferably in the sonic range, although a higher frequency may in some instances be desirable. The vibrational energy of the diaphragm 5 is transmitted to the other walls of the treating chamber so that all the walls of the treating chambers are set in motion. The material being treated is thus subjected to vibration and to the impact of the wall surfaces throughout its travel through the proposed communicating treating chambers.

In the embodiment of the invention shown in Fig. 3, the treating chambers 1 and 2 are substantially filled with a multiplicity of impact elements 30 loosely confined between the opposed spaced walls of the respective chambers. The impact elements 30 are shown in the form of balls or spheres which may for example be hard steel balls, such as those commonly used in ball bearings. Although a single layer of balls may, if desired, be used in each treating chamber, the apparatus is illustrated in Fig. 3 as having two layers of balls in each chamber, and more may be used if desired. The balls or impact elements 30, preferably also substantially fill the communicating opening 15 between successive treating chambers. The restricted openings 12 and 14 between the annular manifolds 11 and 13 and the respective treating chambers prevent the balls escaping into the manifolds.

The vibration of the diaphragm 5 imparts vibratory motion to the impact elements 30, causing them to vibrate back and forth between opposed walls of the treating chamber. The fluent material in the chamber is thereby subjected to rapidly recurring impact of the balls 30 with one another, and with the walls of the chambers. Moreover, it will be seen that the impact of the balls with the central portion 9 of the wall 3 between the chambers produces vibration of this wall, which in turn imparts vibratory motion to the impact elements in the upper treating chamber 2. The balls 30 thus serve the dual function of subjecting the material in the treating chamber to intense vibratory motion and rapidly recurring impacts and of serving as means for transmitting vibrational energy from the vibrated diaphragm 5 to the other walls of the superposed treating chamber. Thus, although the diaphragm 5 which forms the lower wall of the lower treating chamber 1 is the only wall that is directly driven by the electro-magnet 22, the vibrational energy thereby produced is transmitted to the walls of the superposed treating chamber 2 and to any additional treating chambers that may be provided.

The diaphragm 5 may, if desired, be vibrated substantially uniformly throughout its effective area. However, with the particular form of apparatus shown in Fig. 3, the amplitude of vibration will be greatest at the center of the diaphragm and a minimum at its periphery. This means that the most intense action on the fluent material being treated will occur at the center of the diaphragm where there are the most impact elements and where turbulence and thorough mixing of the fluent material occurs, owing to the reversal of its direction of flow in passing from one treating chamber to the succeeding chamber. It will be noted that the inlet and outlet connections for the fluent material are at the periphery of the treating chambers where the vibration is least. This location of the feed and discharge pipes eliminates difficulty in maintaining tight connections. Moreover, the central portions of the respective walls of the treating chambers are unimpeded by any external connections and are hence free to vibrate without obstruction.

It will be seen that by providing a plurality of superposed communicating treating chambers as described, vibrational energy which would otherwise be wasted by being dissipated to the atmosphere in the form of sound waves is effectively utilized to subject the material to treatment in succeeding chambers. As the amount of vibrational energy that can be applied to the diaphragm 5 is limited by the mechanical and electrical limitations of the equipment, the most efficient utilization of the vibrational energy available is highly important. Moreover, the utilization of this energy to do useful work in the succeeding treating chambers reduces the amount that is dissipated to the atmosphere in the form of noise, and thus materially reduces the noise level.

In the embodiment of my invention shown in the accompanying drawings, the dissipation of vibrational energy to the atmosphere is further reduced by at least partially surrounding the treating chamber of the apparatus with an evacuated space. As shown in Fig. 3, a wall member 31 is secured at its periphery by a plurality of bolts 32 to the upper wall 6 of the upper treating chamber 2, the central portions of the walls 6 and 31 being spaced apart to provide a vacuum chamber 33. Connections 34 (Fig. 1) screwed into suitable threaded holes 35 in the plate 31 provide for connections of the vacuum chamber 33 to a suitable vacuum pump or other evacuating apparatus. As sound waves do not travel through a vacuum, the vacuum chamber 33 reduces the dissipation of vibrational energy to the atmosphere from the upper wall 6 of the upper treating chamber 2. This serves the dual function of reducing the noise emitted by the apparatus and of retaining the vibrational energy in the treating chambers where it is put to useful work. For convenience in assembly and disassembly of the apparatus and to avoid interference with the inlet and outlet connections for the treating chambers, the vacuum chamber 33 is shown by way of example as overlying only the central portion of the wall 6. However, as the maximum vibration is at the center of the wall the peripheral portions remaining substantially stationary, a vacuum chamber of the extent shown in the drawings is effective for the intended purpose.

As the space between the diaphragm 5 and the dish-shaped supporting wall 24, i. e., the space in which the magnet 22 is located, is completely closed and can easily be hermetically sealed, this space may also be evacuated to reduce the dissipation of energy in the form of sound waves from the lower surface of the diaphragm 5. Suitable connections may accordingly be provided for connecting this space to a vacuum pump or other evacuating means. While the treating chamber of the apparaus may, if desired, be completely surrounded by a vacuum space, there is relatively little dissipation of energy from the peripheral portions of the chamber walls, and it will therefore generally be sufficient to provide a vacuum chamber such as chamber 33 overlying the upper wall of the treating chamber, and if desired, a vacuum chamber beneath the diaphragm 5, such as the space 36 between the diaphragm and the wall 24 (Fig. 3). In speaking of a vacuum chamber or vacuum space it will be understood that the term "vacuum" is used in a generic sense to include a partial vacuum.

Instead of using the chamber 33 (Fig. 3) as a vacuum chamber, it may in some instances be desirable to use it as a means of controlling the temperature of the material being treated in the treating chamber of the apparatus. For example, a temperature controlling fluid may be circulated through the chamber 33 to either cool or heat the materials in the treating chamber, as desired.

A further embodiment of my invention is shown in Fig. 4, wherein corresponding parts are designated by the same reference numerals as in Figs. 1 to 3. The apparatus shown in Fig. 4 is substantially the same as that described above in conjunction with the preceding figures, except that the lower wall of the treating chamber 1 is formed as a separate plate or disc 37, which is spaced from the diaphragm 5 by an annular spacing member 38. As shown in the drawings, the wall 37 is substantially parallel to and equally spaced from the upper surface of the diaphragm 5. In the space 39 between the wall 37 and the diaphragm there are provided a multiplicity of elastic spheres 40, for example, as hardened steel balls. When the diaphragm 5 is set in position by the electro-magnet 22 the elastic spheres 40 are caused to vibrate rapidly back and forth between the diaphragm and the wall 37. It will be understood that the rapidly recurring impact of the balls 40 with the lower surface of the wall 37 will cause the latter wall to vibrate and that the vibrational energy will in turn be transmitted to the impact elements 30 in the treating chambers and to the other walls of the chambers. The balls 40 thus serve as a kinetic coupling between the diaphragm 5 and the wall 37 of the treating chamber. The space 39 between the wall 37 and the diaphragm 5, may if desired be provided with suitable fluid connections so that the space may be evacuated or a temperature controlling fluid may be circulated through it, as desired. It will be understood that in the embodiment shown in Fig. 4, the lower wall 37 of the treating chamber may be of different material than the diaphragm 5. For example, the wall 37 may be of stainless steel or other corrosion resisting material, while the diaphragm may be formed of iron or steel particularly selected for its vibrational properties.

As the diaphragm 5 must ordinarily be made rather heavy and stiff in order to obtain the desired frequency of vibration, the amplitude of its vibration will be correspondingly limited. The elastic spheres 40 on the other hand are free to move back and forth between the diaphragm 5 and the wall 37 and by properly selecting the size of the spheres and the spacing of the walls their amplitude and vibrational movement may be substantially greater than that of the diaphragm 5. Moreover, the walls 37 and the other walls of the treating chambers may be substantially thinner than the diaphragm and may be designed to have greater amplitude of vibrational movement. The impact elements 30 in the treating chamber, like the balls 40, in the space 39, may have greater amplitude of vibrational movement than the diaphragm 5, depending on the size and number of the balls and the spacing between the walls of the chamber. The arrangement shown thus forms a convenient and effective way of magnifying the amplitude of vibration of the vibrating system. It will be seen that this is likewise true of the arrangement shown in Fig. 3, where the amplitude of vibration of the impact elements 30 and if desired of the walls 6 and 9 may be greater than that of the diaphragm 5. As the speed and effectiveness of the treatment depends on the amplitude as well as on the frequency of vibration, greatly improved results can be achieved with the apparatus and method of the present invention.

The method of operation of the apparatus will be readily understood from the foregoing description. The material to be treated is passed successively through the superposed communicating treating chambers where it is subjected to intense vibration and to the action of the impact elements 30 which vibrate back and forth at high speed through the liquid, thereby subjecting it not only to the rapidly recurring impact of the elements 30 with one another and with the walls of the chamber, but also to the high speed movement of the impact elements through the liquid. With the apparatus shown in the drawings the intensity of vibration progressively increases as the liquid approaches the center of the treating chamber and is at a maximum where it passes from one chamber to the succeeding chamber, and reverses its direction of flow. It will be understood that a pump or other means is provided for passing the fluent material through the treating chambers and that suitable regulating means may be provided for controlling the pressure of the liquid during treatment.

It will be understood that my invention is not limited to the embodiments shown by way of example, and that in carrying out my invention, modification of detail and substitution of equivalents may be made within the scope of the appended claims.

What I claim and desire to secure by Letters Patent is:

1. Apparatus for treating fluent material, which comprises not less than three superposed diaphragms united at their peripheries and having central portions unconnected and closely spaced from one another to form a plurality of superposed chambers, at least one of said diaphragms being apertured to provide communication between successive chambers, a layer of impact elements loosely confined, between said diaphragms, means for fixedly supporting the peripheries of said diaphragms, means for vibrating one of said diaphragms and thereby imparting vibrational motion to said elements and other diaphragms, and connections for passing said fluent material successively through said communicating chambers.

2. Apparatus for treating fluent material, which comprises a plurality of superposed walls united at their peripheries and having central portions spaced apart to provide a plurality of superposed chambers between said walls, at least one of said walls being apertured to provide communication between successive chambers, connections for passing said fluent material successively through said communicating chambers, a multiplicity of impact elements loosely confined in said chambers and in the communicating aperture between successive chambers and means for vibrating a wall of one of said chambers.

3. Apparatus for treating fluent material, comprising a treating chamber having spaced parallel walls and inlet and outlet passages for said material, a multiplicity of impact elements loosely confined between said walls, a vacuum chamber on one side of said treating chamber, a diaphragm on the opposite side of said treating chamber, a wall of the treating chamber being approximately parallel to and spaced from said diaphragm, means for vibrating said diaphragm, and a multiplicity of elastic spheres loosely confined in the space between the diaphragm and the wall of the treating chamber for transmitting vibrational energy from the diaphragm to said wall.

4. Apparatus for treating fluent material, comprising a plurality of superposed walls united at their peripheries and having their central portions spaced apart to provide a series of treating chambers, said walls comprising imperforate upper and lower walls and at least one intermediate wall which is apertured to provide communication between successive ones of said chambers, a diaphragm below and spaced from the lowermost of said walls, the space between said lowermost wall and said diaphragm being out of communication with said treating chambers, means for vibrating said diaphragm, and a multiplicity of elastic spheres loosely confined between the diaphragm and said spaced wall for transmitting vibrational energy from the diaphragm to said wall.

5. Apparatus for treating fluent material, comprising not less than three parallel vibratile walls united and fixedly supported at their peripheries and having their central portions unconnected and spaced apart to provide a series of treating chambers, at least one of said walls being apertured to provide communication between successive ones of said chambers, impact elements of elastic material loosely confined in said chambers, and means for applying vibrational energy to one of said walls to impart vibrational motion to said impact elements and thereby transmit vibrational energy from said wall to other walls of said series of chambers to induce vibration of said other walls, the spacing between said walls being within the range of vibrational movement of said impact elements.

6. Apparatus for treating fluent material comprising a pair of parallel imperforate vibratile walls united and fixedly supported at their peripheries and having their central portions unconnected and spaced apart to provide a treating space, an intermediate wall fixedly held at its periphery between the peripheries of the two first mentioned walls and dividing said space into thin chambers, said intermediate wall having a central opening, an inlet passage extending around and communicating with the periphery of one of said chambers, an outlet passage extending around and communicating with the periphery of another of said chambers and means for applying vibrational energy to one of said first mentioned walls while the peripheral portions of said walls are held substantially stationary.

7. Apparatus for treating fluent material comprising a pair of parallel imperforate vibratile walls united and fixedly supported at their peripheries and having their central portions unconnected and spaced apart to provide a treating space, an intermediate wall fixedly held at its periphery between the peripheries of the two first mentioned walls and dividing said space into thin chambers, said intermediate wall having a central opening, a layer of balls between said intermediate wall and each of said first mentioned walls, the spacing between said walls being not less than the diameter and not substantially greater than twice the diameter of said balls, an inlet passage communicating with the peripheral portion of one of said chambers, an outlet passage communicating with the peripheral portion of another of said chambers and means for applying vibrational energy to one of said first mentioned walls while the peripheral portions of said walls are held substantially stationary.

THOMAS ROBINSON.

REFERENCES CITED

The following references are of record in the file of this patent:

UNITED STATES PATENTS

| Number | Name | Date |
| --- | --- | --- |
| 609,374 | Stone | Aug. 16, 1898 |
| 1,992,938 | Chambers | Mar. 5, 1935 |
| 2,011,951 | Scofield | Aug. 20, 1935 |
| 2,117,965 | Kiesskalt | May 17, 1938 |
| 2,143,099 | Wynn | Jan. 10, 1939 |
| 2,170,178 | Williams | Aug. 22, 1939 |
| 2,363,937 | Brandt | Nov. 28, 1944 |

FOREIGN PATENTS

| Number | Country | Date |
| --- | --- | --- |
| 233,164 | Germany | Apr. 1, 1911 |